Nov. 24, 1942.  F. B. EILERS  2,302,907
LUBRICATING AND SEALING DRAIN DEVICE
Filed April 24, 1939   2 Sheets-Sheet 1
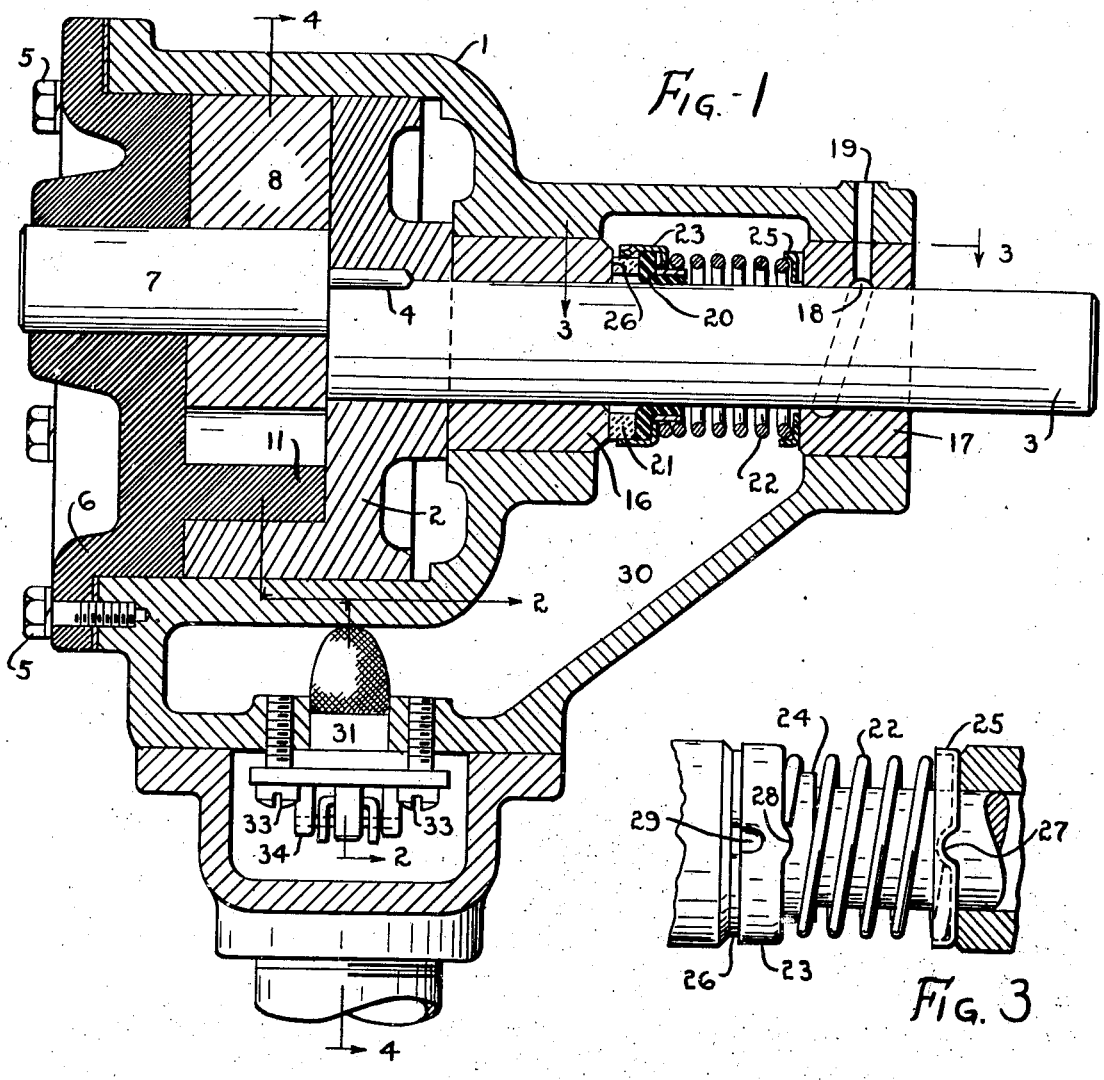
Fig. 1
Fig. 3
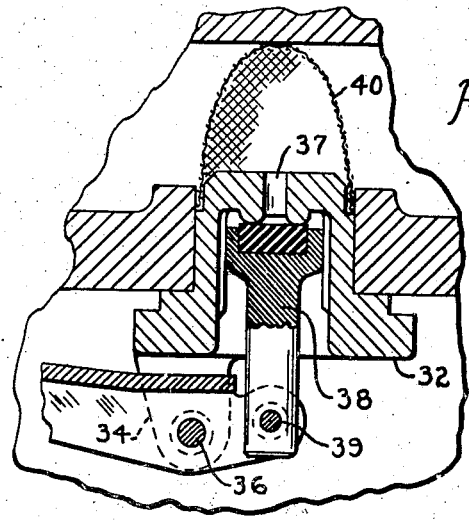
Fig. 2
INVENTOR.
Frank B. Eilers
BY Cox & Moore
ATTORNEYS.

Nov. 24, 1942.    F. B. EILERS    2,302,907
LUBRICATING AND SEALING DRAIN DEVICE
Filed April 24, 1939    2 Sheets-Sheet 2

INVENTOR.
Frank B Eilers
BY Cox & Moore
ATTORNEYS.

Patented Nov. 24, 1942

2,302,907

UNITED STATES PATENT OFFICE 2,302,907

LUBRICATING AND SEALING DRAIN DEVICE

Frank B. Eilers, Fort Wayne, Ind., assignor to Tokheim Oil Tank and Pump Company, Fort Wayne, Ind., a corporation of Indiana Application April 24, 1939, Serial No. 269,639

17 Claims. (Cl. 184—6)

This invention relates to mechanisms adaptable for use with pumping means disposed in liquid fuel lines and particularly is it adaptable for liquid dispensing systems for dispensing or handling dangerous liquids such as gasoline, naphtha and petroleum products and other internal combustion engine fuels.

In liquid flow systems, and particularly liquid dispensing systems, pumps of various types are generally employed for drawing a liquid from a source of supply and for forcing the liquid through the flow or dispensing line. In one aspect the invention is concerned with a provision of means for utilizing the liquid which is forced by the pump for lubricating the bearings of the pump shaft and includes sealing means for the shaft for preventing any of such liquid to pass to the atmosphere and thereby creating a fire hazard. Therefore, among the objects of the present invention are to provide in a liquid distributing or dispensing system, including a pump and its shaft, a bearing means for lubricating such shaft and bearings, with the liquid being circulated by the pump and for providing sealing means for said shaft and bearings, the arrangements being such as to prevent the lubricating liquid passing to the atmosphere and thereby avoiding fire hazard; to provide such a seal as will preclude leakage, while at the same time reducing to the minimum frictional resistance; to provide a self-lubricating seal for the shaft and bearings of the pump which permits a minimum passage of liquid through the seal; to provide a seal for a pump wherein inflammable liquid is forced under pressure through the liquid circulating line and wherein a portion of such liquid is forced through the bearing of the pump shaft for lubrication purposes and wherein any excess of such lubricant liquid passing the seal is automatically returned to the system, and preferably returned to the suction side of the pump, whereby to preclude a leakage of such liquid to atmosphere; to provide self sealing and self lubricating means for a pump shaft and its bearings wherein the liquid pumped is utilized as a lubricant and wherein excess of such lubricant passing the seal is automatically returned to the suction side of the pump during operation of the pump, but is precluded from such return during idle periods of the pump, whereby to prevent loss of prime of the pump and whereby to prevent leakage of liquid on the discharge side of the pump through the bearings and seal and back to the suction side of the pump; to provide in connection with self sealing and self lubricating means for pump bearings handling inflammable liquids, mechanism adapted when the pump is operating to return the excess liquid lubricant passing the sealing means back to the suction side of the pump and adapted during prolonged idleness of the pump to accumulate such excess liquid in a manner such that during such periods of prolonged idleness atmospheric air is thereby precluded from reaching the suction side of the pump; to provide in a gasoline or other motor fuel dispensing system using a pump for forcing a liquid fuel through dispensing line, mechanism associated with the liquid flow line for automatically returning a portion of the liquid back to a portion of the line, and particularly back to the suction side of the pump and said automatic operation being initiated by a change in the condition of flow of the liquid in such flow line; to provide means associated with a gasoline or other motor fuel dispensing line and actuated by the flow of the liquid in the dispensing line for returning a portion of such liquid back to some portion of the dispensing line or flow line, and particularly back to the suction side of the pump; to provide a valve and valve actuating means for a liquid flow line, and particularly for a gasoline or other motor fuel dispensing line, wherein the velocity of flow of the liquid through the line is utilized for operating the valve operating means; to provide valve actuating means for a liquid flow line, particularly for a motor fuel dispensing system, wherein the velocity of flow of the liquid through a portion of the line opens a valve in another portion of the line through which the liquid is not flowing; to provide valve actuating means for a liquid flow line, and particularly for a motor fuel dispensing system wherein the cessation of flow in one portion of the line closes a valve in another portion of the line through which liquid is flowing; to provide these and other objects of invention as will be apparent from a perusal of the following specification when taken in connection with the drawings wherein:

Figure 1 shows a rotary gear pump in section taken on line 1—1 of Fig. 4.

Figure 2 is an enlarged sectional view taken on line 2—2 of Fig. 1, and showing the structure of the drain valve.

Figure 3 is a view of the seal as taken on line 3—3 of Fig. 1.

Figures 4, 5:
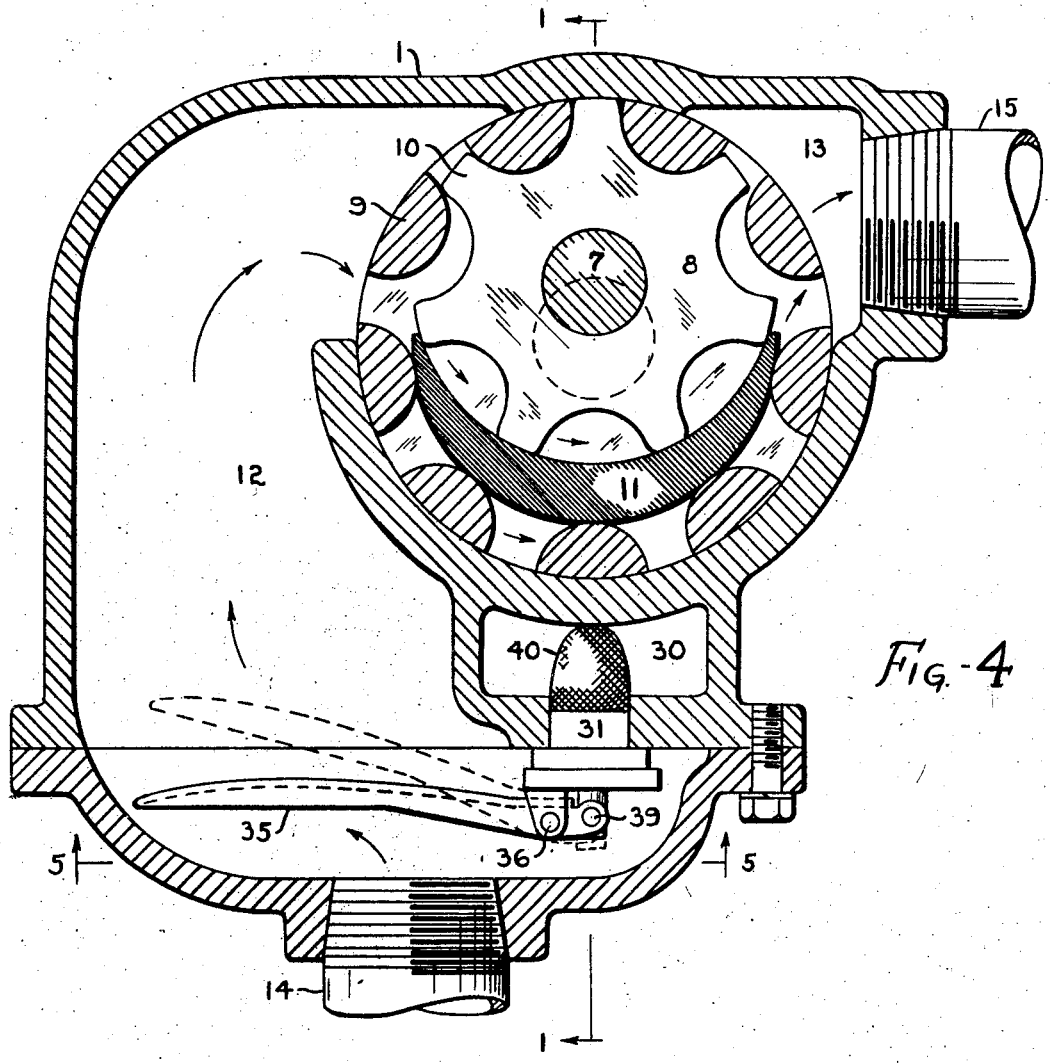
Figure 4 is a cross-sectional view of the pump and its respective parts as shown by line 4—4 of Fig. 1.
Figure 5 is a sectional view taken on line 5—5 of Fig. 4 showing the operating mechanism for the drain valve.

The present invention is disclosed with reference to any type of liquid circulation system wherein a pump is utilized in the system for forcing the liquid therethrough; preferably the invention is illustrated in connection with a portion of a dispensing line forming a part of a system for dispensing inflammable liquids, including gasoline, naphtha and petroleum product or other motor fuel. In particular the invention is illustrated in connection with the conventional type of gear pump in the dispensing line of a standard or conventional type of service station pump for dispensing motor fuel, the conventional type of such dispensing line including an underground tank for the gasoline or other fuel, a liquid dispensing line into said tank, and including a foot valve or an angle valve of the usual construction, an electric motor driven pump of the type herein illustrated for drawing the liquid from the tank and for forcing the same through the dispensing line; also in the dispensing line on the discharge side of the pump is located the usual type of volume and/or price indicating or computing means. In addition, the discharge side of the meter includes the usual sight-glass and the usual flexible hose which terminates in a dispensing nozzle, preferably valve-controlled. In certain aspects the present invention is concerned with the pump for use for this dispensing line or, from a broader aspect, for a pump with any liquid flow line. The particular aspect of the invention, insofar as the pump is concerned, is the provision of means by which a portion of the liquid forced by the pump through the liquid flow line is utilized for lubricating the bearings of the pump shaft and sealing means, as provided for preventing excess of such lubricant liquid escaping to atmospheric air or leaking past the bearings. In connection with this sealing means and the pump bearings, means is provided for automatically returning excess liquid which passes the sealing means to the system or to the suction side of the pump and also at predetermined times for precluding its return to the suction side of the pump for collecting it in a pool or reservoir utilized during prolonged idleness of the pump for preventing atmospheric air entering the suction side of the pump and likewise for preventing liquid at the discharge side of the pump passing through the pump bearings and back to the suction side of the pump.

Referring now to the drawings in detail, there is shown a rotary gear pump having a preferably horizontal driving shaft about which is a rotating seal. The particular type of pump and the particular type of seal do not constitute a part of this invention, as any type of pump or any type of seal may be used. For purposes of illustration and not by way of limitation, there is shown a main pump body 1 provided with a pump rotor 2 securely attached to the pump shaft 3 by means of pin 4. Attached to pump body 1 by means of screws 5 is a pump head 6. Securely pressed in this head is stationary pin 7 serving as the pintle for the idler gear 8 of the pump. Figure 4 shows better that teeth 9 of the rotor 2 are enmeshed with teeth 10 of the idler 8. The pintle 7 is eccentric with the main shaft 3 of the pump, thereby causing a space between the teeth of the respective gears in one side of the pump. This space is filled by a protruding crescent-shaped member 11 extending from the head 6. The pump is provided with an inlet chamber 12 and an outlet 13. The delivery or suction side of the pump communicating with chamber 12 is shown at 14, while the discharge pipe from the discharge pump chamber 13 is shown at 15.

The bearings for the pump shaft comprise two preferably bronze bearings 16 and 17 suitably spaced apart. These bearings are press-fitted in the body 1 and provide journals for the pump shaft 3. Bearings 17 is provided with an oil groove 18 which is fed by the conventional oil hole 19 passing through the housing 1. Bearing 16 is lubricated by the liquid that the pump is delivering. This liquid is forced or works its way past the gears in the pump and flows between bearing 16 and the shaft 3. As this lubricant liquid reaches the outer end of the bearing 16 it is prevented from passing axially along the shaft 3 by a synthetic rubber ring 20 which is preferably of L-shaped cross-section. A ring 21 which is of some suitable material having low frictional resistance is held against the bearing 16 by a spring 22. This spring forces the retaining ring 23 against the outer flange of the ring 20 and against the sealing ring 21. A collar 24 holds the inner portion of ring 20 tightly against the shaft 3. The frictional resistance of ring 20 causes it to be driven by the shaft 3 and this in turn drives the other elements associated therewith, including the sealing ring 21. At the outer end of this seal there is provided a retaining ring 25 against which a spring 22 abuts.

Oil from the bearing 17 works inwardly and lubricates the surface between the retaining ring 25 and the bearing 17. It can therefore be seen that the spring, seal and other members rotate with the shaft. The actual seal is at 26. In order to assure that these various parts will rotate, means is provided to interlock them together. This is best shown in Fig. 3. The retaining ring 25 is provided with an indentation 27 in its face which is acted upon by the end of the spring 22 and drives it. The spring is driven by a lug 28 extending from the collar 23. To assure the collar 23 and the sealing ring 21 rotating an indentation 29 is provided for locking the two together. The specific structure of this seal is no part of the present invention except insofar as it enters into combination with the other features and structures herein set forth. It is to be understood that these seals operate very efficiently. However, some liquid will pass the sealing portion and provision must be made for taking care of this liquid to prevent it from possibly leaking to atmosphere and thereby constituting a fire hazard where the liquid by nature is inflammable. In certain of the aspects of the present invention, it resides in the provision of means for taking care of or draining the sealing chamber of this excess liquid lubricant. To this end above the seal and extending downwardly is a chamber 30 which has in its bottom wall a valve 31. This valve allows communication between the sealing chamber and the suction side of the pump during the operation of the pump.

The valve body 32 which is preferably made of a die casting is secured to the pump body by means of screws 33. On the lower face are two extending arms 34 which support and operate arm 35 by means of pin 36. In the top of the valve body is a small bore 37 and on the inner side surrounding said bore is an outwardly extending valve seat. Valve means is provided for cooperation with this seat and comprises sealing material such as cork or synthetic rubber supported in valve 38, the lower end of the valve being supported on a pin 39 which in turn is controlled by a lever 35. About the top of valve 32 is a screen 40 for preventing foreign matter entering the valve.

In the operation of the device the in-flow of liquid from the pipe 14 tends to raise the lever 35 and this raising of the left-hand side of the lever causes the valve 38 to be drawn away from its seat and open so that any liquid which has accumulated in chamber 30 will be drawn into chamber 12 because of the vacuum present. When the pump is in idle position the lever 35 will ordinarily take the position shown in solid lines, Fig. 4, and will hold its associated valve 38 closed, as shown in Fig. 2. Thus it can be seen that any liquid which passes the pump seal will automatically be returned through the suction line of the pump to the system. However, it is desirable that this valve 31 be closed when the pump is in idle position so that during prolonged periods of idleness atmospheric air may not enter the suction side of the pump, causing the pump to lose its prime; also by closing the valve 31 any liquid during prolonged idleness of the pump which might possibly return through the pump bearings and seal from the delivery pipe cannot pass to the suction line of the pump.

What I claim is new is:

1. In a device of the class described, in combination with means forming a liquid flow line, a pump in said line, and having a shaft and bearings therefor, means for diverting a portion of the liquid being pumped to lubricate the pump shaft bearings, means to return diverted liquid back to the suction side of the pump, and means operable when the pump is idle for preventing atmospheric air passing through said return means to the suction side of the pump.

2. In a device of the class described, in combination with means forming a liquid dispensing line, a pump in said line, a liquid collecting chamber connected to the discharge side of the pump, whereby a portion of the liquid being pumped is passed to said chamber, and valved means shiftable by the movement of the liquid flowing through the dispensing line to return liquid in said chamber to the suction side of the pump, said valved means automatically closing when the pump is idle to prevent atmospheric air passing to the suction side of the pump.

3. In a liquid dispensing device, in combination with means forming a liquid dispensing line, a pump for forcing liquid through said line, a liquid collecting chamber, means for diverting a portion of the liquid being pumped through said line to said chamber, valve means for returning liquid from said chamber back to the suction side of the pump, and means controlled by the movement of the liquid flowing through said line for controlling said valve means.

4. In a device of the class described, in combination with means forming a liquid flow line, a pump in said line having a shaft and bearings therefor, means for diverting a portion of the liquid being pumped to lubricate the bearings, valve means for returning lubricant back to the suction side of the pump and means controlled by the velocity of the liquid in a portion of the flow line for controlling the valved means.

5. In a device of the class described, in combination with means forming a liquid flow line, a pump in said line having a shaft and bearings therefor, means for diverting a portion of the liquid being pumped to lubricate the bearings, valve means for returning lubricant back to the suction side of the pump and means actuated by the liquid flow for opening the valve means.

6. In a device of the class described, in combination with means forming a liquid flow line, a pump in said line, a mechanism to be lubricated, means for diverting a portion of the liquid being pumped to lubricate said mechanism, valve means for returning lubricant back to the suction side of the pump and means actuated by cessation of liquid flow for closing the valve means.

7. In a liquid dispensing system including a liquid dispensing line, a pump in said line for forcing liquid through said dispensing line, a liquid collecting chamber, means for causing a portion of the liquid being pumped through said line to be diverted from said line to said chamber, and means to return liquid collecting in said chamber to the suction side of the pump, and means actuated by the movement of the liquid in said line for controlling the return of said liquid back to the suction side of the pump.

8. In combination, means forming a liquid flow line, a pump in said line, said pump having a shaft and bearings therefor, a casing enclosing said pump, said shaft and said bearings, said casing including a sump below said bearings, means for passing a portion of the pumped liquid into contact with said shaft to lubricate it, means connecting said sump to the inlet side of the pump, a valve controlling said connecting means and mechanism disposed in the flow line to be actuated by the liquid flow for actuating said valve.

9. In combination, means forming a liquid flow line, a pump in said flow line for forcing liquid therethrough, said pump having a shaft, a bearing for said shaft, a seal for said bearing surrounding said shaft, means for diverting a portion of the pumped liquid along such shaft to lubricate said bearing, means providing a lubricant-collecting chamber disposed below said bearing whereby excess lubricant escaping past said seal may flow into said collecting chamber, a conduit connecting said collecting chamber with the inlet side of said pump, valve means for said conduit and means automatically actuated by movement of said pump for opening said valve.

10. In combination, means forming a liquid flow line, a pump in said flow line for forcing liquid therethrough, said pump having a shaft, a bearing for said shaft, a seal for said bearing surrounding said shaft, means for diverting a portion of the pumped liquid along such shaft to lubricate said bearing, means providing a lubricant-collecting chamber disposed below said bearing whereby excess lubricant escaping past said seal may flow into said collecting chamber, a conduit connecting said collecting chamber with the inlet side of said pump, valve means for said conduit and means for closing said valve on cessation of said pump.

11. In combination, means forming a liquid flow line, a pump in said flow line for forcing liquid therethrough, said pump having a shaft, a bearing for said shaft, a seal for said bearing surrounding said shaft, means for diverting a portion of the pumped liquid along such shaft to lubricate said bearing. means providing a lubricant-collecting chamber disposed below said bearing whereby excess lubricant escaping past said seal may flow into said collecting chamber, a conduit connecting said collecting chamber with the inlet side of said pump, valve means for said conduit, means disposed in the path of the liquid inlet to said pump and adapted to be actuated by the liquid as it flows to the inlet of said pump for opening said valve, said means automatically closing said valve upon the cessation of liquid flow.

12. In combination, means forming a liquid flow line, a pump in said flow line for forcing liquid therethrough, said pump having a shaft, a bearing for said shaft, a seal for said bearing surrounding said shaft, means for diverting a portion of the pumped liquid along such shaft to lubricate said bearing, means providing a lubricant-collecting chamber disposed below said bearing whereby excess lubricant escaping past said seal may flow into said collecting chamber, a conduit connecting said collecting chamber with the inlet side of said pump, valve means for said conduit, said valve means including a pivotally mounted actuating arm extending directly in the path of the inlet pipe to the inlet side of said pump and adapted to be shifted by a liquid flow for actuating said valve.

13. In a device of the class described, in combination with means forming a main liquid flow line, a pump in said line, a mechanism to be lubricated, means for diverting a portion of the liquid being pumped by said pump from said main flow line to said mechanism to be lubricated, whereby to lubricate said mechanism, means to return diverted liquid from said mechanism back to the suction side of the pump, and means operable when the pump is idle for preventing air passing through said return means to the suction side of the pump.

14. In a device of the class described, in combination with means forming a main liquid flow line, a pump in said line, a mechanism through which fluid is to be delivered during the operation of the pumping means, means for diverting a portion of the liquid being pumped by said pump from said main flow line to said mechanism, means to return diverted liquid from said mechanism back to the suction side of the pump, and means operative when the pump is idle and inoperative when the pump attains a predetermined fluid pumping rate for preventing air passing through said return means to the suction side of the pump.

15. In a device of the class described, in combination with means forming a main liquid flow line, a pump in said line, a mechanism to be lubricated through which fluid is to be delivered during the operation of the pumping means, means for diverting a portion of the liquid being pumped by said pump from said main flow line to said mechanism, means to return diverted liquid from said mechanism back to the suction side of the pump, and means operable when the velocity of the liquid in a portion of the flow line drops below a predetermined minimum for preventing air passing through said return means to the suction side of the pump.

16. In a device of the class described, in combination with means forming a main liquid flow line, a pump in said line, a mechanism to be lubricated, means for diverting a portion of the liquid being pumped by said pump from said main flow line to said mechanism to be lubricated whereby to lubricate said mechanism, means to return diverted liquid from said mechanism back to the suction side of the pump, and means controlled by the velocity of the liquid in a portion of the flow line for preventing atmospheric air passing through said return means to the suction side of the pump.

17. In a device of the class described, in combination with means forming a liquid dispensing line, a pump in said line, a liquid collecting chamber within which liquid is adapted to be collected from a source of supply, and valve means shiftable by the movement of the liquid flowing through the dispensing line to transmit liquid in said collecting chamber to the suction side of the pump, said valve means automatically closing when the pump is idle to prevent atmospheric air passing to the suction side of the pump.

FRANK B. EILERS.